D. JOHNSON.
Churn.
No. 21,501. Patented Sept. 14, 1858.
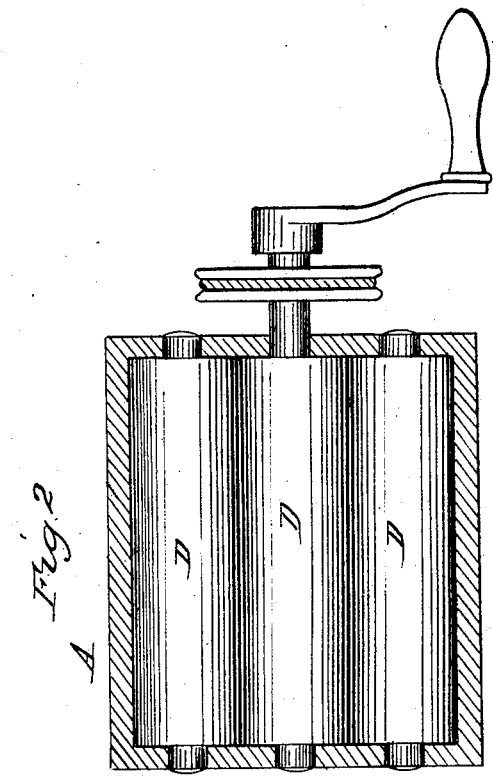
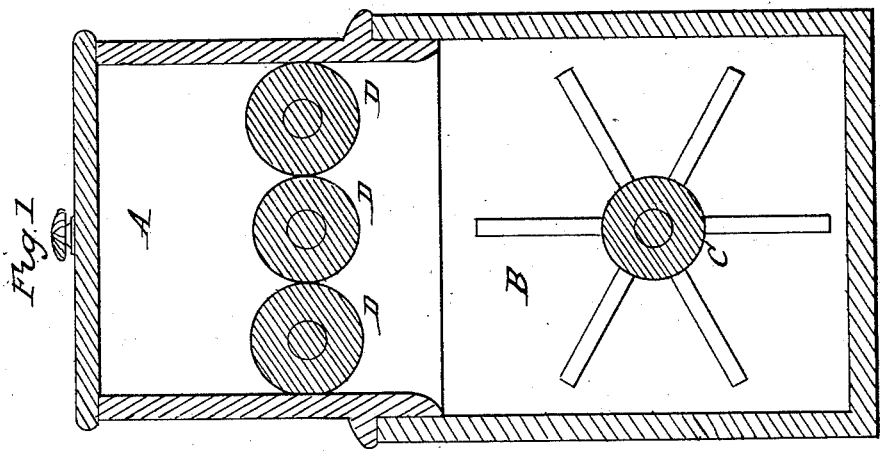

UNITED STATES PATENT OFFICE.

DANL. JOHNSON, OF NEW YORK, N. Y.

CHURN.

Specification of Letters Patent No. 21,501, dated September 14, 1858.

*To all whom it may concern:*

Be it known that I, DANIEL JOHNSON, of the city, county, and State of New York, have invented a new and Improved Churn; and I do hereby declare that the following is a full and exact description thereof, reference being had to the accompanying drawings, of which—

Figure 1 is a vertical section. Fig. 2 is a plan in section.

The nature of my invention consists in the employment of two or more rollers when placed horizontal and with their peripheries touching or nearly touching one another, in combination with a revolving dasher which is arranged underneath said rollers and in the same box or chamber with the same. By this combination, it is thought butter can be produced very quickly and left in a sweet and palatable state, for by placing the rollers horizontal instead of vertical, the cream is subjected to an intense friction, and its globules mashed or broken, without becoming impaired by the heat created by the friction of the rollers, at the point between which the cream passes to have its globules mashed or broken is as fine as the edge of a knife and consequently the fatty matter and buttermilk have a ready and quick escape into the lower part of the box, where, if the friction has not been sufficient to produce the butter perfectly, they are agitated or operated upon by the revolving dasher to any further extent necessary to accomplish the perfect production of the butter; whereas, when the rollers are placed vertical, the cream has to be subjected to an intense friction, as it descends, along a greater portion of the length of the rollers and consequently becomes heated to such a degree as to impair the quality of the butter.

By using the revolving dasher, the use of horizontal rollers is practicable for if the butter is not produced by the thin friction edge through which the cream passes, by subjecting it to an agitating action its perfect formation is insured.

To enable others skilled in the art to construct this churn I will proceed to describe the same.

For the purpose of convenience in operating, the churn is made in two parts (A and B.). The lower part (B,) has placed within itself a horizontol agitator (C,) consisting of a shaft with six rows of pins inserted therein, which pins are about one-fourth of an inch square and the same distance apart; the pins in one line are made to cover the spaces in the preceding and succeeding ones alternately, that the mass of cream may be more thoroughly beaten up than when dashers of the common kind are used.

The upper part (A,) is fitted to set in or upon the part before described. Within its interior space are placed three rollers (D, D, D,) they occupy a position near the bottom, are in line or nearly so with each other and occupy or cover by their length and combined diameters the entire space between the sides and ends of the box, the rollers must bear upon each other with such force and be so accurately fitted that the cream cannot pass between them until they are put in motion; the desired tightness of fitting is secured by placing the central roller a trifle above or below the others to which it may be adjusted by pressure in any convenient way.

Motion is given to the central roller by a crank at its end and the other rollers are either made to revolve with it by friction upon their surfaces, or they may be geared together. Motion is also given to the agitator (C,) by wheels connected with the first, or in any convenient way.

By the plan herein proposed the cream to be "churned" is placed within the receptacle (A,). The rollers are then set in motion, the effect of which is to draw in between and compress the cream, passing it through them gradually and in detail, so that every particle is subjected to an equal action, and the globules before mentioned are instantly crushed; when nothing further is necessary than a trifling degree of agitation to break up the already crushed particles, cause the requisite separation and complete the process, a few minutes only being necessary by this means to accomplish the purpose.

A greater or less number of rollers than above specified or more than one tier of them may be used if desired, and the agitator may also have an increased or less number of beaters as will be well understood by any mechanic.

What I claim as my invention and desire to secure by Letters Patent, is—

The employment of two or more rollers when placed horizontal and with their peripheries touching or nearly touching one another, in combination with a revolving dasher which is arranged underneath said rollers and in the same box or chamber with the same, substantially as and for the purposes set forth.

DANIEL JOHNSON.

Witnesses:
N. BARLVENE,
L. PITKIN.